UNITED STATES PATENT OFFICE.

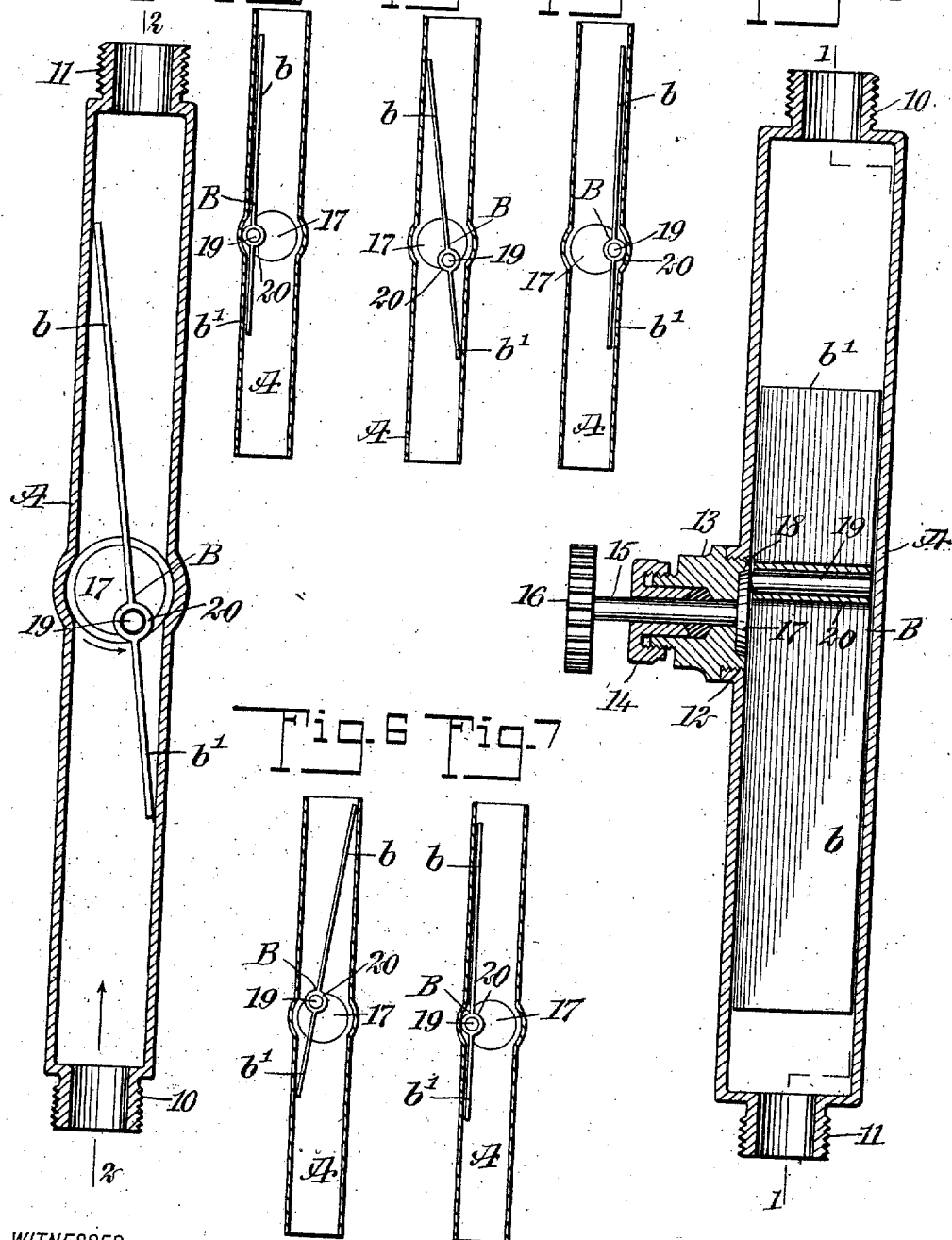

EDWARD PAUL GUENTHER, OF WEST HOBOKEN, NEW JERSEY.

MACHINE FOR EXERTING PRESSURE.

No. 873,539.    Specification of Letters Patent.    Patented Dec. 10, 1907.

Application filed September 5, 1907. Serial No. 391,459.

*To all whom it may concern:*

Be it known that I, EDWARD PAUL GUENTHER, a citizen of the United States, and a resident of West Hoboken, in the county of Hudson and State of New Jersey, have invented a new and useful Improvement in Machines for Exerting Pressure, of which the following is a full, clear, and exact description.

My invention relates to mechanism for exerting pressure, being adaptable to devices varying considerably in function, and the purpose of the invention is to provide a simple and economic device for exerting pressure upon gaseous or liquid substances, being particularly serviceable as a pump to be used in connection with automobiles, and like motors, or for propelling vessels.

The invention is also applicable for use in hot houses and for drainage purposes generally.

It is a further purpose of the invention to provide a device of the character described that will admit of a free passage of liquid through it no matter in what position the pressure exerting plate or blade may be; and it is also a purpose of the invention to so construct the device that the pressure exerting blade can be quickly changed so as to alter the direction of the delivery of the water.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a section through the conduit illustrating the pressure exerting blade in a longitudinal edge view, the section being taken practically on the line 1—1 of Fig. 2; Fig. 2 is a section through the conduit taken at an angle to that shown in Fig. 1, and practically on the line 2—2 of Fig. 1; Figs. 3, 4, 5, and 6 are sectional views illustrating the positions of the pressure exerting blade during one cycle, or during one revolution of the eccentric controlling the said pressure exerting blade.

A represents a conduit, preferably rectangular in cross section, and in the present instance constituting the casing for the pump. The conduit is provided with an inlet 10 at one end, and a discharge 11 at the opposite end, and in operation is usually placed in a tank of still water, but it may receive its supply in any desired manner. An opening 12 is made in one side surface of the conduit A covered by a journal box 13 having a suitable gland 14, and a shaft 15 is passed through said gland and journal box, being provided at its outer end with a gear 16 or pulley, whereby the shaft may be driven from any source of power. A crank disk 17 is secured to the inner end of the shaft 12, being fitted to turn in a seat 18 produced in the bottom of the journal box, as is shown in Fig. 2, and the crank pin 19 of the said disk extends by preference substantially to the opposite side of the conduit, as is also shown in Fig. 2. The crank pin 19 constitutes the pivot and operating factor for the pressure exerting plate or blade B provided between its ends with a bearing 20 for the said crank pin 19. The longitudinal edge of the blade closely approaches the opposing inner faces of the conduit, as is also shown in Fig. 2, and that section $b$ of the blade B that extends in direction of the outlet 11 of the conduit, is made longer than the section $b'$ that extends in direction of the inlet 10, so that the discharge section $b$ has a greater excess of leverage over the receiving section $b'$; but both ends of the blade or plate B are well within the conduit.

The operation of the device is very simple; supposing the first position of the blade or plate B to be that shown in Fig. 3, wherein it lies parallel with a side of the conduit, the crank disk 17 being revolved, the next position of the blade or plate B will be that shown in Fig. 4, wherein it assumes a diagonal position relatively to the conduit. The shorter section $b'$ of the blade or plate moves quicker than the longer section $b$, and provides for a volume of water between the longer section $b$ and the opposing side of the conduit. In the next position of the plate or blade it lies parallel with the opposing side of the conduit as is shown in Fig. 5, and in assuming this position the longer end of the blade or plate B moves quickly and forcibly against the water, causing it to be ejected at the delivery end of the conduit in such a manner that none of the water can flow back of the blade.

The movements just described, constitute a half cycle, and it may be observed that as the longer end of the blade produces the expelling action described, the shorter end of the blade will bring about a suction action. After the blade or plate B has assumed the position shown in Fig. 5, it is next carried to the diagonal position shown in Fig. 6, the reverse of that shown in Fig. 4, and then assumes its initial position shown in Fig. 7. Thus it will be observed that during a cycle the blade or plate B brings about two discharge actions and simultaneously two suction actions. Since the plate or blade B is pivoted upon the crank pin 19, the water is free if the pressure is strong enough, to pass comparatively unobstructed through the conduit, no matter whether the blade or plate B is in action or whether it is stationary. Furthermore, it is obvious that the blade or plate B may be reversed, thus quickly making what was formerly the delivery end of the conduit, the receiving end.

Having thus described my invention, I claim as new and desire to secure by Letters Patent,—

1. In a mechanism for exerting pressure, a conduit, a blade therein, and means eccentrically connected with the blade for vibrating said blade transversely to the conduit.

2. In a mechanism for exerting pressure, a conduit, a blade therein, a support eccentrically connected with the blade, and means for revolving the support.

3. In a mechanism for exerting pressure, a conduit, a pressure exerting blade disposed within the same, and provided with a bearing nearer one end than the other, and an actuating device comprising a crank disk and a driving mechanism therefor, a pin from the said disk extending within the bearing of the said blade, the said blade being unsupported between its bearing and its ends.

4. In a mechanism for exerting pressure, a conduit, a pressure exerting blade disposed therein, and a single actuating means for pivotal connection with the said blade at a point between its ends, one end of the blade being longer than the other, the said blade being reversibly located within the conduit.

In testimony whereof I have signed my name to this specification in the presence of two subscribing witnesses.

EDWARD PAUL GUENTHER.

Witnesses:
  WM. M. SCHULTZ,
  JAMES A. SMITH.